(12) United States Patent
Miyata et al.

(10) Patent No.: US 8,695,210 B2
(45) Date of Patent: Apr. 15, 2014

(54) METHOD OF MANUFACTURING AN ND BASED SINTERED MAGNET

(75) Inventors: Koji Miyata, Echizen (JP); Takehisa Minowa, Echizen (JP); Hajime Nakamura, Echizen (JP); Koichi Hirota, Echizen (JP); Masakatsu Honshima, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 882 days.

(21) Appl. No.: 12/673,315

(22) PCT Filed: Nov. 27, 2009

(86) PCT No.: PCT/JP2009/070010
§ 371 (c)(1),
(2), (4) Date: Feb. 12, 2010

(87) PCT Pub. No.: WO2010/064578
PCT Pub. Date: Jun. 10, 2010

(65) Prior Publication Data
US 2011/0210810 A1 Sep. 1, 2011

(30) Foreign Application Priority Data
Dec. 4, 2008 (JP) .................................. 2008-309338

(51) Int. Cl.
*H01F 7/02* (2006.01)
*H01F 1/047* (2006.01)

(52) U.S. Cl.
USPC ................... 29/607; 310/154.21; 310/154.28; 310/154.29; 310/156.43; 148/105; 148/108

(58) Field of Classification Search
USPC ................... 310/44, 154.21, 154.22, 154.28, 310/154.29, 156.23, 156.43, 156.45; 29/607, 596, 598; 148/101, 105, 108
See application file for complete search history.

(56) References Cited

U.S. PATENT DOCUMENTS

| 7,045,092 B2 * | 5/2006 | Ogawa et al. ............. 148/108 X |
| 2004/0145263 A1 | 7/2004 | Kojima et al. |

(Continued)

FOREIGN PATENT DOCUMENTS

| JP | 62242316 A * | 10/1987 | ................ 148/101 X |
| JP | 5-21218 A | 1/1993 | |

(Continued)

OTHER PUBLICATIONS

Notification of Transmittal of Translation of the International Preliminary Report on Patentability (Form PCT/ISA/237) of International Application No. PCT/JP2009/070010 mailed Mar. 2, 2010.

(Continued)

*Primary Examiner* — A. Dexter Tugbang
(74) *Attorney, Agent, or Firm* — Westerman, Hattori, Daniels & Adrian, LLP (57) ABSTRACT

A method for preparing the magnet includes the steps of: (a) providing a sintered Nd base magnet block having surfaces and a magnetization direction, (b) coating the surfaces of the magnet block excluding the surface perpendicular to the magnetization direction with a Dy or Tb oxide powder, a Dy or Tb fluoride powder, or a Dy or Tb-containing alloy powder, (c) treating the coated block at a high temperature for causing Dy or Tb to diffuse into the block, and (d) cutting the block in a plane perpendicular to the magnetization direction into a magnet segment having a coercive force distribution on the cut section that the coercive force is high at the periphery and lower toward the inside and a constant coercive force distribution in the magnetization direction.

2 Claims, 6 Drawing Sheets

(56) References Cited

U.S. PATENT DOCUMENTS

2007/0017601 A1* 1/2007 Miyata et al. ............ 148/105
2008/0054736 A1* 3/2008 Miyata et al. ........ 310/156.45 X

FOREIGN PATENT DOCUMENTS

| JP | 5-31807 B2 | 5/1993 |
| JP | 2006-261433 A | 9/2006 |
| JP | 2008-61333 A | 3/2008 |
| JP | 2009-254092 A | 10/2009 |
| WO | 03/079516 A1 | 9/2003 |
| WO | 2006/043348 A1 | 4/2006 |
| WO | 2008/075709 A1 | 6/2008 |

OTHER PUBLICATIONS

International Search Report of PCT/JP2009/070010, date mailing Mar. 2, 2010.

K.D. Durst et al, "The Coercive Field of Sintered and Melt-Spun NdFeB Magnets," Journal of Magnetism and Magnetic Materials 68, 1987, pp. 63-75, Holland.

Kenichi Machida et al, "Grain Boundary Modification and Magnetic Properties of Nd-Fe-B Sintered Magnets" Proceedings of the 2004 Spring Meeting of the Japan Society of Powder & Powder Metallurgy, pp. 202.

K.T. Park et al, "Effect of Metal-Coating and Consecutive Heat Treatment on Coercivity of Thin Nd-Fe-B Sintered Magnets," Proceedings of the Sixteenth International Workshop on Rare-Earth Magnets and Their Applications, 2000, pp. 257, Sendai, Japan.

* cited by examiner

P (REGION WITH IMPROVED COERCIVE FORCE)
C (REGION WITH COERCIVE FORCE UNCHANGED)

FIG.2B

MAGNETIZATION DIRECTION

METHOD OF MANUFACTURING AN ND BASED SINTERED MAGNET

TECHNICAL FIELD

This invention relates to a sintered Nd base magnet which is increased in coercive force while suppressing a decline of remanence (or residual flux density), and a method for preparing the same, and more particularly, to a sintered Nd base magnet suited for use in permanent magnet rotary machines capable of high speed rotation such as electric vehicle motors, power generators and FA motors, and a method for preparing the same.

BACKGROUND ART

By virtue of excellent magnetic properties, sintered Nd base magnets find an ever increasing range of application. In the field of rotary machines such as motors and power generators, permanent magnet rotary machines using sintered Nd base magnets have recently been developed in response to the demands for weight and profile reduction, performance improvement, and energy saving.

The permanent magnets within the rotary machine are exposed to elevated temperature due to the heat generation of windings and iron cores and kept susceptible to demagnetization by a magnetic field of opposite direction from the windings. There thus exists a need for a sintered Nd base magnet having heat resistance, a certain level of coercive force serving as an index of demagnetization resistance, and a maximum remanence serving as an index of magnitude of magnetic force.

Several methods are known to improve coercive force.

An increase in the remanence of sintered Nd base magnets can be achieved by increasing the volume factor of $Nd_2Fe_{14}B$ compound and improving the crystal orientation. To this end, a number of modifications have been made on the process. For increasing coercive force, there are known different approaches including grain refinement, the use of alloy compositions with greater Nd contents, and the addition of effective elements. The currently most common approach is to use alloy compositions in which Dy or Tb substitutes for part of Nd. Substituting these elements for Nd in the $Nd_2Fe_{14}B$ compound increases both the anisotropic magnetic field and the coercive force of the compound. The substitution with Dy or Tb, on the other hand, reduces the saturation magnetic polarization of the compound. Therefore, as long as the above approach is taken to increase coercive force, a loss of remanence is unavoidable.

In sintered Nd base magnets, the coercive force is given by the magnitude of an external magnetic field created by nuclei of reverse magnetic domains at grain boundaries. Formation of nuclei of reverse magnetic domains is largely dictated by the structure of the grain boundary in such a manner that any disorder of grain structure in proximity to the boundary invites a disturbance of magnetic structure, helping formation of reverse magnetic domains. It is generally believed that a magnetic structure extending from the grain boundary to a depth of about 5 nm contributes to an increase of coercive force. See Non-Patent Document 1: K. D. Durst and H. Kronmuller, "THE COERCIVE FIELD OF SINTERED AND MELT-SPUN NdFeB MAGNETS," Journal of Magnetism and Magnetic Materials, 68 (1987), 63-75.

The inventors discovered that when a slight amount of Dy or Tb is concentrated only in proximity to the interface of grains for thereby increasing the anisotropic magnetic field only in proximity to the interface, the coercive force can be increased while suppressing a decline of remanence (Patent Document 1: JP-B H05-31807). Further the inventors established a method of producing a magnet comprising separately preparing a $Nd_2Fe_{14}B$ compound composition alloy and a Dy or Tb-rich alloy, mixing and sintering (Patent Document 2: JP-A H05-21218). In this method, the Dy or Tb-rich alloy becomes a liquid phase during the sintering step and is distributed so as to surround the $Nd_2Fe_{14}B$ compound. As a result, substitution of Dy or Tb for Nd occurs only in proximity to grain boundaries of the compound, which is effective in increasing coercive force while suppressing a decline of remanence.

The above method, however, suffers from some problems. Since a mixture of two alloy fine powders is sintered at a temperature as high as 1,000 to 1,100° C., Dy or Tb tends to diffuse not only at the interface of $Nd_2Fe_{14}B$ crystal grains, but also into the interior thereof. An observation of the structure of an actually produced magnet reveals that Dy or Tb has diffused in a grain boundary surface layer to a depth of about 1 to 2 microns from the interface, and the diffused region accounts for a volume fraction of 60% or above. As the diffusion distance into crystal grains becomes longer, the concentration of Dy or Tb in proximity to the interface becomes lower. Lowering the sintering temperature is effective to minimize the excessive diffusion into crystal grains, but not practically acceptable because low temperatures retard densification by sintering. An alternative approach of sintering a compact at low temperature under a pressure applied by a hot press or the like is successful in densification, but entails an extreme drop of productivity.

Another method for increasing coercive force is known in the art which method comprises machining a sintered magnet into a small size, applying Dy or Tb to the magnet surface by sputtering, and heat treating the magnet at a lower temperature than the sintering temperature for causing Dy or Tb to diffuse only at grain boundaries. See Non-Patent Document 2: K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000), and Non-Patent Document 3: K. Machida, H. Kawasaki, S. Suzuki, M. Ito and T. Horikawa, "Grain Boundary Tailoring of Nd—Fe—B Sintered Magnets and Their Magnetic Properties," Proceedings of the 2004 Spring Meeting of the Powder & Powder Metallurgy Society, p. 202. Since Dy or Tb is more effectively concentrated at grain boundaries, this method succeeds in increasing the coercive force without substantial sacrifice of remanence. This method is applicable to only magnets of small size or thin gage for the reason that as the magnet has a larger specific surface area, that is, as the magnet is smaller in size, a larger amount of Dy or Tb is available. However, the application of metal coating by sputtering poses the problem of low productivity.

Patent Document 3: WO 2006/043348A1 discloses means for efficiently improving coercive force which has solved the foregoing problems and lends itself to mass-scale production. When a sintered $R^1$—Fe—B magnet body, typically sintered Nd—Fe—B magnet body is heated in the presence of a powder on its surface, the powder comprising one or more of $R^2$ oxides, $R^3$ fluorides, and $R^4$ oxyfluorides (wherein each of $R^1$ to $R^4$ is one or more elements selected from among rare earth elements inclusive of Y and Sc), $R^2$, $R^3$ or $R^4$ contained in the powder is absorbed in the magnet body, whereby coercive force is increased while significantly suppressing a decline of remanence. Particularly when $R^3$ fluoride or $R^4$ oxyfluoride is used, $R^3$ or $R^4$ is efficiently absorbed in the magnet body along with fluorine, resulting in a sintered magnet having a high remanence and a high coercive force. In Patent Document 3, since absorption treatment is carried out on the magnet surface, the magnet body to be treated is prepared by machining a sintered magnet block to a predetermined shape. The dimensions of the magnet body are not particularly limited. The patent describes: "The amount of $R^2$, $R^3$ or $R^4$ absorbed into the magnet body from the powder deposited on the magnet surface and comprising at least one of $R^2$ oxide, $R^3$ fluoride and $R^4$ oxyfluoride increases as the specific surface area of the magnet body is larger, i.e., the size thereof is smaller. For this reason, the magnet body includes a maximum side having a dimension of up to 100 mm, preferably up to 50 mm, and more preferably up to 20 mm, and a side having a dimension of up to 10 mm, preferably up to 5 mm, and more preferably up to 2 mm in the direction of magnetic anisotropy. Most preferably, the dimension in the magnetic anisotropy direction is up to 1 mm." This intends absorption treatment over a wider region of the magnet body. In Example, a magnet body which has been machined to the final shape is subjected to absorption treatment. In the permanent magnet rotary machine, however, the area susceptible to demagnetization is only a portion of magnet, suggesting that the high coercive force portion need not necessarily account for the major region of a magnet body. Finishing to the final shape means that small magnet bodies are to be handled, giving rise to the problem that the process efficiency is not increased due to difficulty of handling.

Figure 4:
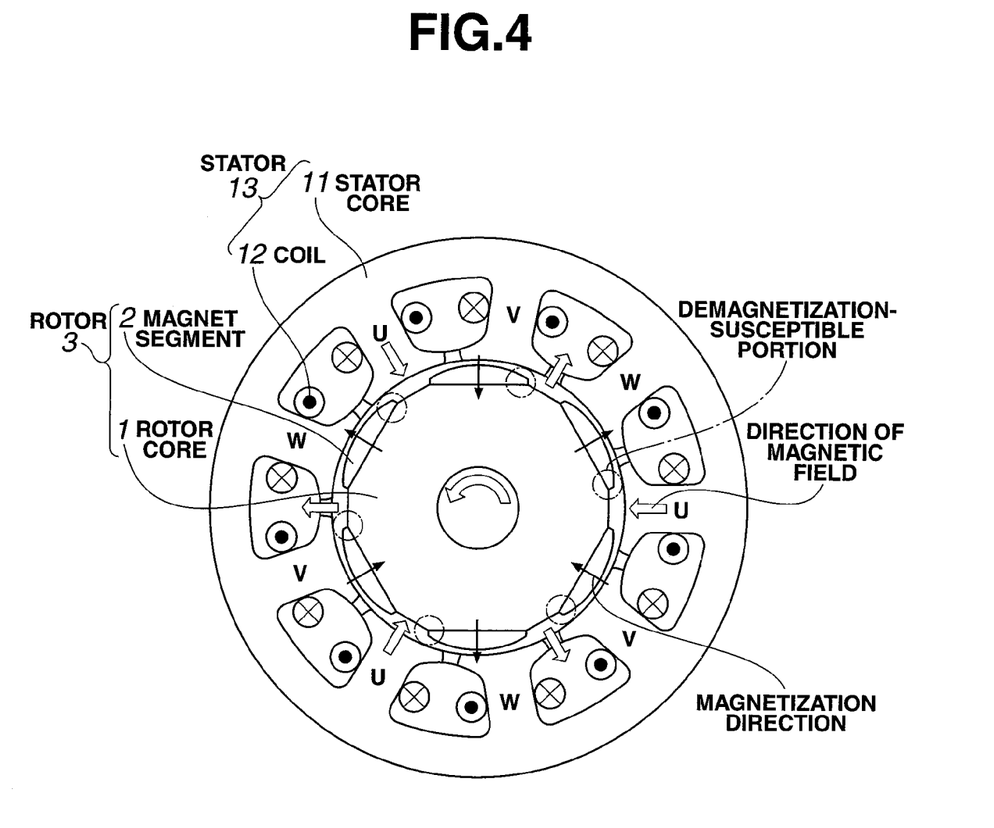
FIG. 4 is a cross-sectional view of one exemplary 6 pole, 9 slot, surface-mounted permanent magnet motor.

An example is taken to illustrate that the area susceptible to demagnetization in the permanent magnet rotary machine is localized rather than the entirety of magnet. In AC servo motors, for example, a permanent magnet rotary machine with a radial air gap as illustrated in FIG. 4 is used. This permanent magnet rotary machine comprises a rotor 3 including a rotor core 1 and permanent magnet segments 2 attached to the surface of the core, and a stator 13 surrounding the rotor 3 to define a gap therebetween and including a stator core 11 having a plurality of slots and coils 12 wound on teeth. In the permanent magnet rotary machine illustrated in FIG. 4, the number of permanent magnet poles is six (6), the number of teeth is nine (9), and the arrow associated with a permanent magnet segment indicates a direction of magnetization thereof. With regard to the permanent magnet segments, magnetic orientation is effected in a parallel magnetic field so that a direction of easy magnetization is parallel to the center axis of the magnet segment. The coils are wound on teeth as a concentrated winding and connected in Y connection of three phases: U, V and W phases. The solid circle of a coil denotes that the coil winding direction is forward and the crossing (X) of a coil denotes that the coil winding direction is backward, with respect to the plane of paper.

In AC servo motors and similar motors requiring high precision torque control, the torque must have less ripples. Accordingly, it is undesired that when the permanent magnets rotate, the alignment of stator slots and the permanent magnets causes cogging torque to develop due to variations of the magnetic flux distribution across the gap (i.e., torque without current flowing across the coil) or torque ripples to occur when driven by current flowing across the coil. The torque ripples exacerbate controllability and additionally, cause noise. The cogging torque may be reduced by configuring a permanent magnet segment to a cross-sectional shape that tapers from the center toward transverse ends as shown in FIG. 4. With this configuration, the end portion of a permanent magnet segment which is a magnetic pole switch area developing a noticeable variation of magnetic flux distribution produces a smoothened magnetic flux distribution, reducing the cogging torque.

When electric current flows across coils, magnetic fields are developed in the directions of broad arrows depicted in the stator core region, so that the rotor is rotated counterclockwise. At this point, an aft area of a permanent magnet segment in the rotating direction (a circled area in FIG. 4) is in a situation susceptible to demagnetization because the magnetic field is in an opposite direction to the magnetization of the permanent magnet segment. Demagnetization would not only reduce the driving torque, but also give rise to the problem of increased cogging torque due to locally uneven magnetic field.

CITATION LIST

Patent Document

Patent Document 1: JP-B H05-31807
Patent Document 2: JP-A H05-21218
Patent Document 3: WO 2006/043348A1

Non-Patent Document

Non-Patent Document 1:
K. D. Durst and H. Kronmuller, "THE COERCIVE FIELD OF SINTERED AND MELT-SPUN NdFeB MAGNETS," Journal of Magnetism and Magnetic Materials, 68 (1987), 63-75
Non-Patent Document 2:
K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000)
Non-Patent Document 3:
K. Machida, H. Kawasaki, S. Suzuki, M. Ito and T. Horikawa, "Grain Boundary Tailoring of Nd—Fe—B Sintered Magnets and Their Magnetic Properties," Proceedings of the 2004 Spring Meeting of the Powder & Powder Metallurgy Society, p. 202

SUMMARY OF INVENTION

Problems to be Solved by the Invention

An object of the invention, which addresses the prior art problems discussed above, is to provide a sintered Nd base magnet which includes a demagnetization-susceptible region having a high coercive force and has, mass productivity so that it is suited for use in permanent magnet rotary machines, and a method for preparing the same.

Means for Solving the Problems

As described above, the permanent magnet used in a permanent magnet rotary machine includes a demagnetization-susceptible region which is localized. It would be desirable if the demagnetization-susceptible region of the permanent magnet used in a permanent magnet rotary machine is improved in coercive force.

The inventors have found that by providing a sintered Nd base magnet block (sintered rare earth magnet, typically $Nd_2Fe_{14}B$ system) having a sufficient thickness in a magnetization direction, effecting diffusion reaction of Dy or Tb inward from the surfaces of the magnet block excluding the surfaces perpendicular to the magnetization direction, thereby producing the magnet block in which the coercive force near the surfaces is higher than in the interior, and cutting the magnet block in a direction perpendicular to the magnetization direction by means of a cutter blade, wire saw or the like, a plurality of magnet segments of predetermined size can be manufactured from one magnet block; that when the magnet block subject to diffusion treatment is preferably dimensioned to a maximum dimension in a direction perpendicular to the magnetization direction (where diffusion reaction of Dy or Tb takes place) of up to 100 mm, more preferably up to 50 mm, even more preferably up to 10 mm, and a maximum length in the magnetization direction (where diffusion reaction does not take place) of at least 30 mm, more preferably at least 100 mm, absorption treatment with Dy or Tb can be effected on the magnet block of such large size, whereby the throughput of the process is improved.

The invention provides a sintered Nd base magnet and a preparation method as defined below.

A method for preparing a sintered Nd base magnet comprising the steps of:

providing a sintered Nd base magnet block having surfaces and a magnetization direction, coating the surfaces of the magnet block excluding the surface perpendicular to the magnetization direction with a Dy or Tb oxide powder, a Dy or Tb fluoride powder, or a Dy or Tb-containing alloy powder, treating the coated block at a high temperature for causing Dy or Tb to diffuse into the block, and cutting the block in a plane perpendicular to the magnetization direction into a magnet segment having a coercive force distribution on the cut section that the coercive force is high at the periphery and lower toward the inside and a constant coercive force distribution in the magnetization direction.

A method for preparing a sintered Nd base magnet according to claim 1, further comprising the step of machining the magnet segment on its surface perpendicular to the magnetization direction into a C or D shape.

A method for preparing a sintered Nd base magnet according to claim 1 or 2 wherein the magnet block has a maximum dimension of up to 100 mm in a Dy or Tb-diffusing direction perpendicular to the magnetization direction and a maximum length of at least 30 mm in the magnetization direction.

A sintered Nd base magnet segment obtained by the method of claim 1, having a coercive force distribution on the cut section that the coercive force is high at the periphery and lower toward the inside and a constant coercive force distribution in the magnetization direction.

A sintered Nd base magnet segment according to claim 4 which is machined on its surface perpendicular to the magnetization direction into a C or D shape.

A sintered Nd base magnet segment according to claim 4 or 5 which is used as permanent magnet in a permanent magnet rotary machine.

Advantageous Effects of Invention

According to the invention, the sintered Nd base magnet is free of a decline of remanence, has a high coercive force, especially at the edges thereof, and is unsusceptible to demagnetization even at high temperature. The magnet is suited for use in permanent magnet rotary machines.

BRIEF DESCRIPTION OF DRAWINGS

FIG. 1 is a perspective view of a magnet block in one embodiment of the invention, FIG. 1A showing the block during diffusion treatment, and FIG. 1B showing the block being cut.

FIG. 2 illustrates the coercive force distribution of the magnet segment in one embodiment of the invention, FIG. 2A being a cross section taken perpendicular to the magnetization direction, and FIG. 2B being a cross section taken at the center in the magnetization direction.

FIG. 3 illustrates the shape of magnet segment in different embodiments of the invention, FIG. 3A showing a rectangular shape, FIG. 3B showing a D shape, and FIG. 3C showing a C shape.

DESCRIPTION OF EMBODIMENTS

According to the invention, a sintered Nd base magnet is prepared by providing a sintered Nd base magnet block having surfaces and a magnetization direction, coating the surfaces of the magnet block excluding the surfaces perpendicular to the magnetization direction with a Dy or Tb oxide powder, a Dy or Tb fluoride powder, or a Dy or Tb-containing alloy powder, treating the coated block at a high temperature for causing Dy or Tb to diffuse into the block, and cutting the block in a plane perpendicular to the magnetization direction into a magnet segment having a coercive force distribution on the cut section that the coercive force is high at the periphery and lower toward the inside and a constant coercive force distribution in the magnetization direction. The resultant sintered Nd base magnet segment is free of a decline of remanence, has a high coercive force, especially at the edges thereof, and is unsusceptible to demagnetization even at high temperature. The magnet segment is suited for use in permanent magnet rotary machines.

The magnet alloy composition of the sintered Nd base magnet block subject to diffusion treatment with Dy or Tb may be any well-known magnet alloy composition, specifically consisting essentially of 10 to 15 atom % of Nd, Pr or Dy, 3 to 15 atom % of B, and 0 to 11 atom % of at least one element selected from Al, Cu, Zn, In, Si, P, S, Ti, V, Cr, Mn, Ni, Ga, Ge, Zr, Nb, Mo, Pd, Ag, Cd, Sn, Sb, Hf, Ta, and W, with the balance being at least 50 atom % of Fe. A fraction of Fe which ranges from more than 0 atom % to 40 atom % may be replaced by Co.

Such a sintered Nd base magnet block may be prepared by any well-known methods.

For absorption treatment with Dy or Tb, a method using sputtered film as described in Non-Patent Document 3, and a method of coating the magnet surface with a Dy or Tb oxide powder, Dy or Tb fluoride powder, or Dy or Tb-containing alloy powder, and heating at high temperature for diffusion as described in Patent Document 3 may be employed. These methods are effective in increasing the coercive force of magnet near the surface without a loss of remanence. When the resulting magnet is used in a rotary machine, the rotary machine is expected to be resistant to heat and produce a high power.

Figure 1A:
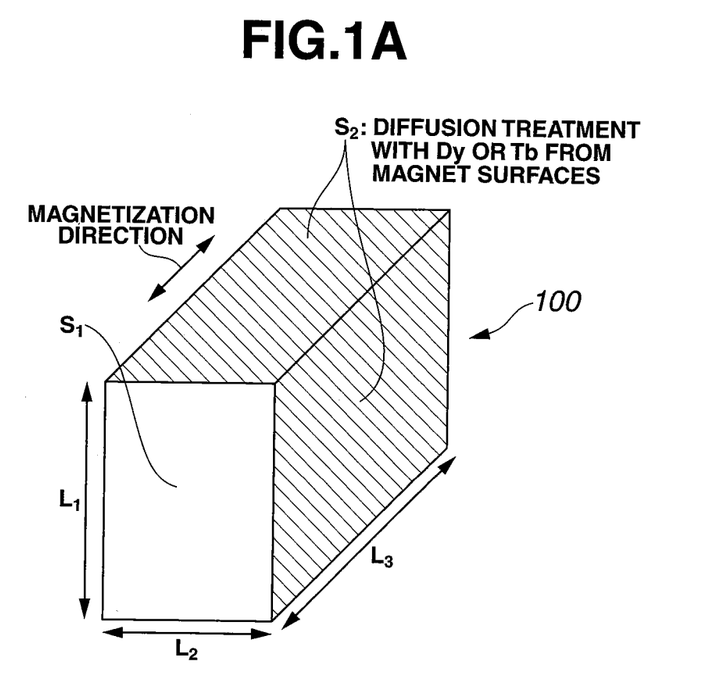

The sintered Nd base magnet block used herein is preferably of rectangular box shape. In FIG. 1, the sintered Nd base magnet block generally depicted at 100 is shaped to have a maximum dimension $L_1$ among dimensions $L_1$ and $L_2$ in a direction perpendicular to the magnetization direction where Dy or Tb diffuses which is up to 100 mm, preferably up to 50 mm, and more preferably up to 20 mm, and a maximum length $L_3$ in the magnetization direction where diffusion reaction does not take place which is at least 30 mm, preferably at least 100 mm. Dy or Tb is diffused inward of the sintered Nd base magnet block from the surfaces $S_2$ excluding the surfaces $S_1$ perpendicular to the magnetization direction and mainly via grain boundaries, thereby improving the coercive force of the magnet block near the surfaces. In FIG. 1, Dy or Tb is diffused into all the surfaces $S_2$ excluding the surfaces $S_1$ perpendicular to the magnetization direction. The dimension in a direction perpendicular to the magnetization direction is preferably at least 1 mm, and more preferably at least 3 mm. The length in the magnetization direction is preferably up to 200 mm, and more preferably up to 150 mm, though its upper limit is not critical.

The magnet block is coated by dispersing a powder of Dy or Tb oxide or fluoride or a powder of Dy or Tb alloy in water or an organic solvent such as ethanol. The dispersion is sprayed or coated to the selected area of the magnet block to form a partial coating. Alternatively, a masking tape or film is attached to a coat-unnecessary portion (bottom surfaces in the magnetization direction) of the magnet block, after which the magnet block is dipped in the dispersion whereby a coating of the oxide, fluoride or alloy is formed on the selected area of the magnet block.

After the coating is formed, the magnet block is heated for absorption treatment at a temperature of 350° C. to the sintering temperature of the magnet for 30 seconds to 100 hours, preferably 1 minute to 8 hours. This is preferably followed by aging treatment at a temperature of 200° C. to the sintering temperature for 1 minute to 10 hours.

Figure 1B:
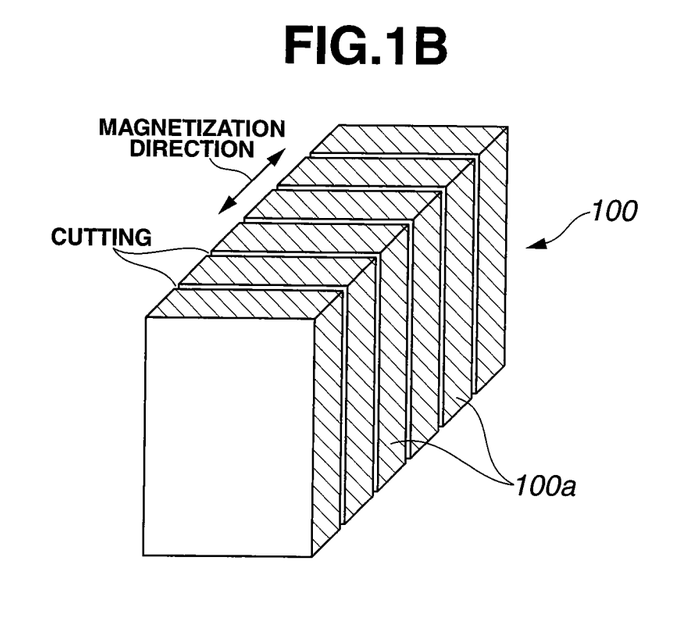

The magnet block 100 thus treated is cutoff machined by means of a cutter blade, wire saw or the like in a direction perpendicular to the magnetization direction, as shown in FIG. 1B, into a plurality of magnet segments 100a which may be stacked one on top of the other and which have a dimension in the magnetization direction of 1 mm to 20 mm, that is suited as the magnet for use in motors and power generators. Since the large size magnet block is subjected to diffusion/absorption treatment with Dy or Tb, the throughput of the process is improved. The magnet segment obtained by the process has a coercive force distribution as outlined in FIG. 2. The coercive force is increased near the magnet surfaces.

Figure 2A:
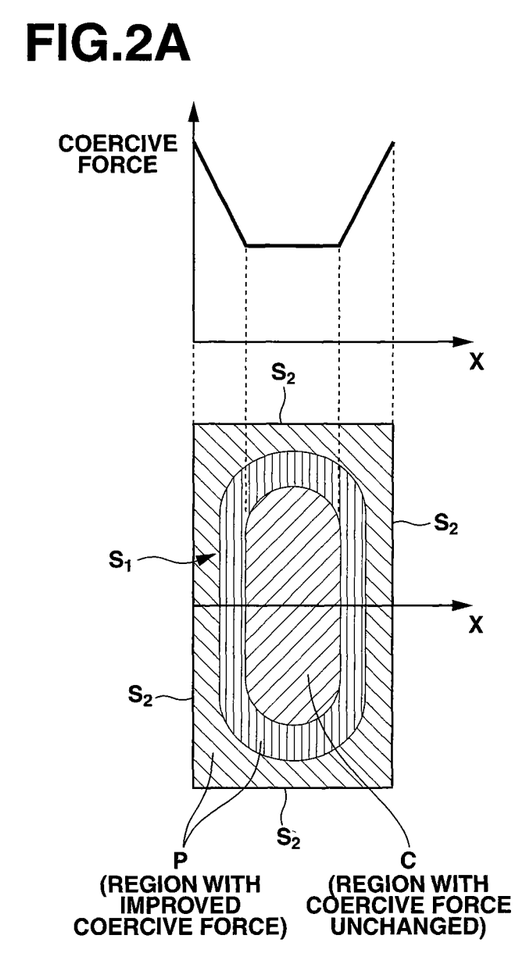
Figure 2B:
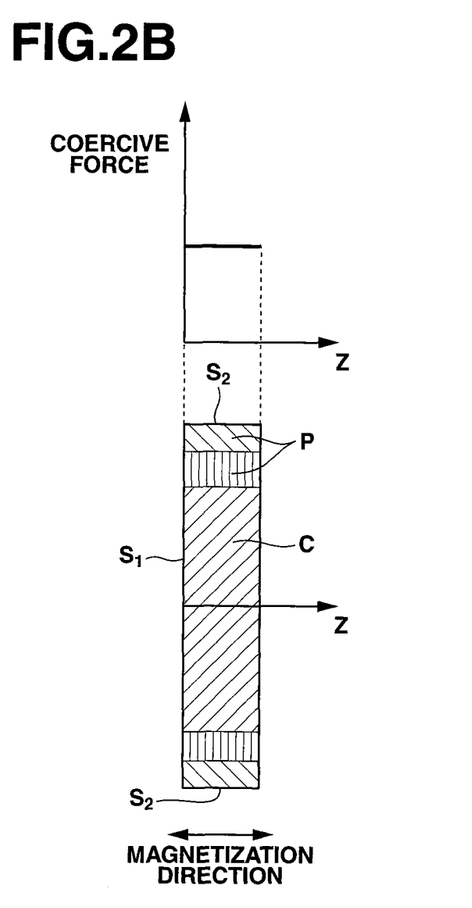

FIG. 2A shows a coercive force distribution on surface S1 perpendicular to the magnetization direction. Diffusion treatment with Dy or Tb has been performed on all surfaces S2 excluding surfaces S1. The surface S1 includes a peripheral region P having an improved coercive force and a central region C having a coercive force unchanged. FIG. 2B shows a cross section taken at the center in the magnetization direction.

Figure 5:
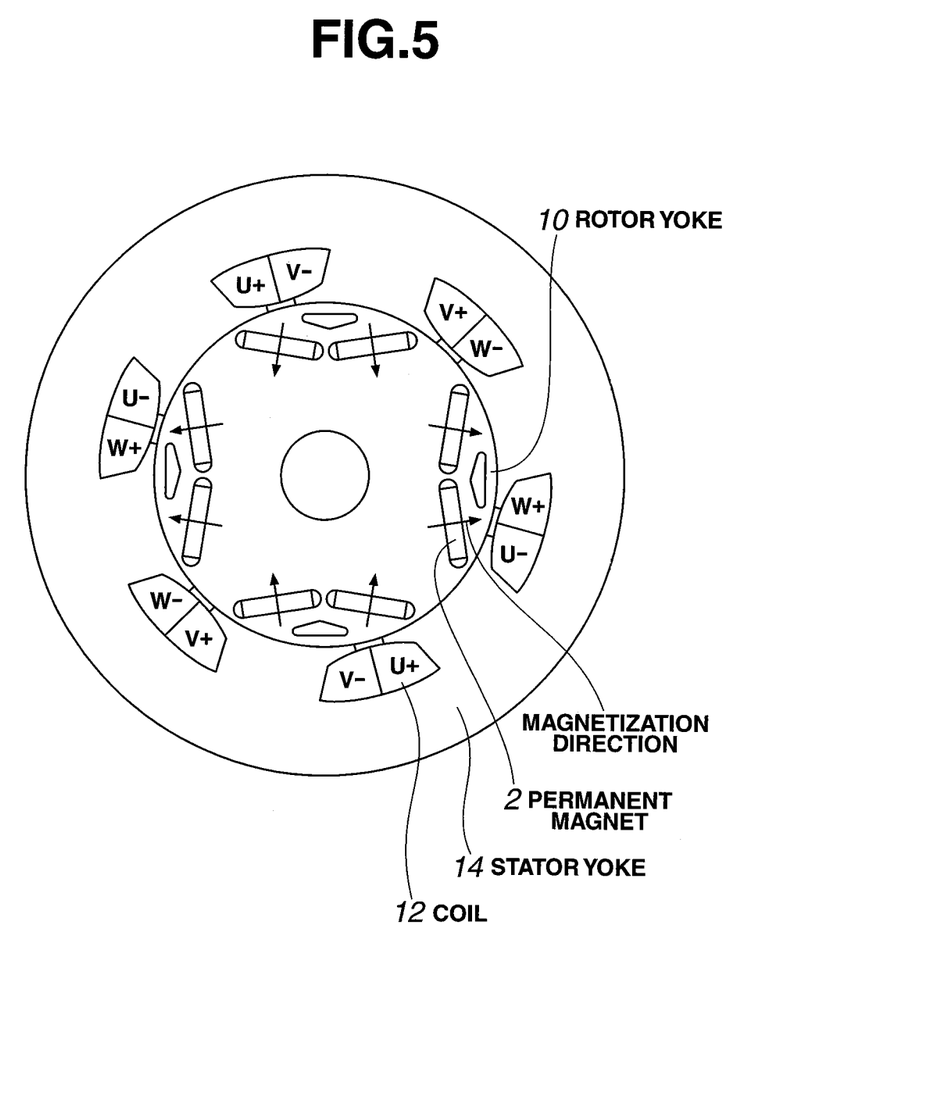
FIG. 5 is a cross-sectional view of one exemplary 4 pole, 6 slot, interior permanent magnet motor.

FIG. 4 shows a surface-mounted magnet rotary machine, illustrating that the magnet used therein includes a demagnetization-susceptible region which is localized and located near the surfaces parallel to the magnetization direction. This is also true in an interior magnet rotary machine as shown in FIG. 5. In FIG. 5, the rotor has a four-pole structure comprising a rotor yoke 10 of laminated magnetic steel sheets and permanent magnet segments 2 embedded therein. The stator has a six-slot structure of laminated magnetic steel sheets, with a coil 12 concentratedly wound on each teeth. The coil 12 is of a three-phase Y-connection of U, V and W phases. In FIG. 5, the symbols "+" and "−" attached to U, V and W indicate winding directions of coils, with "+" indicating a direction emerging from the plane of sheet and "−" indicating an entering direction. While the rotor and stator are positioned as shown in FIG. 5, an alternating current of cosine wave flows as the U phase, an alternating current having a 120° lead phase relative to the U phase flows as the V phase, and an alternating current having a 240° lead phase relative to the U phase flows as the W phase. Then the rotor rotates counterclockwise by the interaction between the magnetic flux of permanent magnets and the magnetic flux of coils. In FIG. 5, a stator yoke 14 is depicted.

Figure 3A:
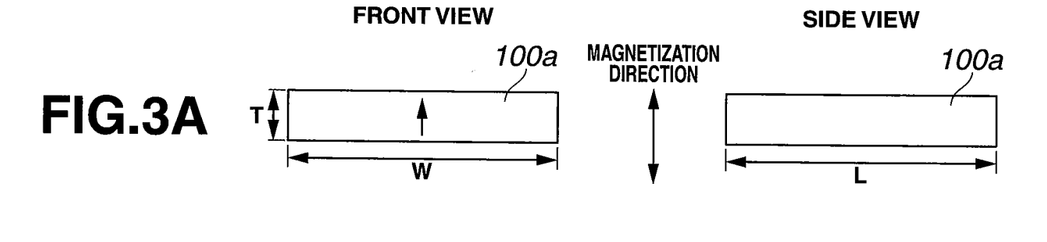
Figure 3B:
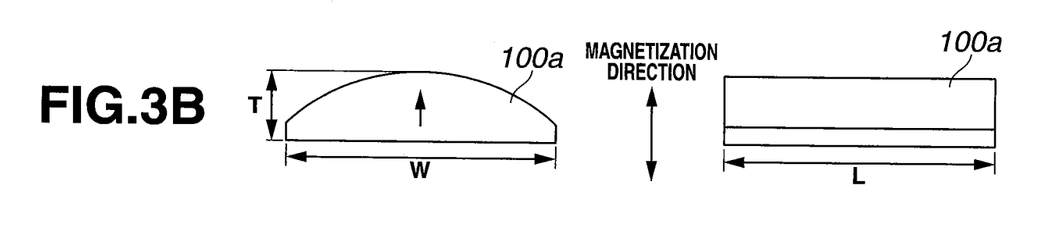
Figure 3C:
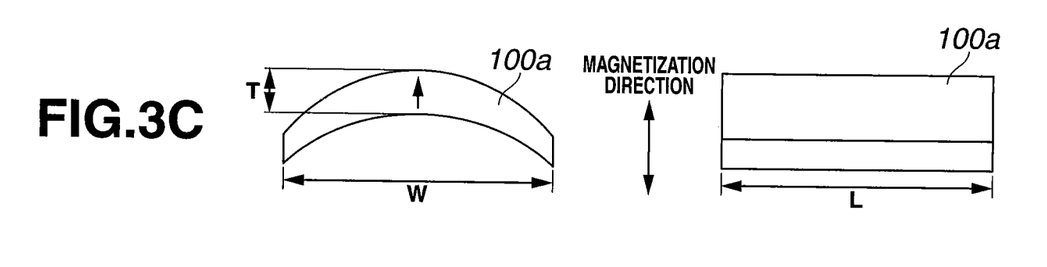

The permanent magnet segment for use in the permanent magnet rotary machine has a cross-sectional shape which is selected from a rectangular shape as shown in FIG. 3A which is easy to work, a convex or D shape as shown in FIG. 3B, and an arc or C shape as shown in FIG. 3C, which are thinned at the edge for the purpose of smoothing induced voltage waveform or reducing cogging torque for suppressing torque ripples in the rotary machine. The rectangular shape may be as cut or obtained by further grinding the cut section to some extent for smoothing. The C or D shape may be obtained by machining the surface(s) of the magnet segment perpendicular to the magnetization direction into the desired shape. The magnet segment machined into the desired shape has a coercive force distribution which is kept essentially unchanged from the distribution of FIG. 2 because the surfaces where the coercive force is increased are not machined. That is, the magnet segment has a coercive force increased near the surfaces extending parallel to the magnetization direction where demagnetization is likely to occur in the permanent magnet rotary machine. In particular, magnet segments of D or C shape are thinned at edges corresponding to near the surfaces extending parallel to the magnetization direction, and the thin edge portions are susceptible to demagnetization due to intensified demagnetizing field. If the coercive force of these portions is increased, then demagnetization resistance is improved. Thus the magnet segments are effective particularly when D or C shaped.

EXAMPLE

Examples are given below for illustrating some embodiments of the invention although the scope of the invention is not limited thereby.

Examples 1 and 2 and Comparative Example 1

Magnetic Properties of Examples and Comparative Example

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to a weight cumulative median particle size of 4 μm. The resulting fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block of 51 mm×17 mm×110 mm (thickness in the magnetic anisotropy direction). Using a diamond grinding wheel, the permanent magnet block was machined on all the surfaces into a parallelepiped magnet block as shown in FIG. 3. The magnet block had dimensions: L=50 mm, W=16 mm and T=109 mm (T in magnetic anisotropy direction). The machined magnet block was cleaned with an alkaline solution, pickled and dried. Steps of rinsing with deionized water were included before and after each cleaning step.

Next, dysprosium fluoride having an average particle size of 5 μm (as measured by Microtrac) was mixed with ethanol at a weight fraction of 50%, in which the magnet block having two surfaces perpendicular to the magnetization direction masked with tape was immersed for one minute with ultrasonic waves being applied. The magnet block was pulled up and immediately dried with hot air. The tape strips masking the two surfaces were removed. At this point, the filling factor of dysprosium fluoride in the magnet surface-surrounding space was 45%. The magnet block was subjected to absorption treatment in an argon atmosphere at 900° C. for one hour, then to aging treatment at 500° C. for one hour, and quenched. Using a diamond cutter, the magnet block was cut in a plane perpendicular to the magnetization direction into segments having a thickness of 3.6 mm. Using a diamond grinding wheel, the magnet segment was curvature worked on its surface perpendicular to the magnetization direction into a D shape. The final shape of magnet segment as shown in FIG. 3 has L=50 mm, W=16 mm, an arc having a radius of curvature of 12 mm, and a thickness T in the magnetization direction of 3.5 mm. This magnet segment of D shape is designated M1. For comparison purposes, a magnet segment P1 was prepared by carrying out only heat treatment and similarly working into a D shape.

A magnet block of the same shape as M1 and P1 prior to machining was provided. Terbium fluoride having an average particle size of 5 μm was mixed with ethanol at a weight fraction 50%, in which the magnet block having two surfaces perpendicular to the magnetization direction masked with tape was immersed for one minute with ultrasonic waves being applied. The magnet block was pulled up and immediately dried with hot air. The tape strips masking the two surfaces were removed. At this point, the filling factor of terbium fluoride in the magnet surface-surrounding space was 45%. The magnet block was subjected to absorption treatment in an argon atmosphere at 900° C. for one hour, then to aging treatment at 500° C. for one hour, and quenched. This was followed by cutting and working as in the case of M1, obtaining a magnet segment of D shape. This magnet segment is designated M2.

The magnetic properties of these magnet segments (as measured by a vibrating sample magnetometer) are shown in Table 1. For magnetic property measurement, cubic samples of 1 mm one side were cut out so that the magnetic properties of different regions of a magnet segment were evaluated. The magnet segment within the scope of the invention showed a coercive force near the surface which was increased 500 kAm$^{-1}$ relative to the coercive force of magnet segment P1 not subjected to dysprosium absorption treatment. Since the magnet interior was at a distance of 8 mm from the surface, the interior absorbed no dysprosium, with its coercive force kept unchanged. A distribution of coercive force was determined, finding coercive force increases in a region extending 6 mm from the surface. The magnet segment M2 subjected to terbium absorption treatment showed a coercive force which was increased 800 kAm$^{-1}$ relative to the coercive force of magnet segment P1 not subjected to absorption treatment. The magnet segments within the scope of the invention showed a decline of remanence which was as small as 5 mT. For comparison purposes, a permanent magnet was prepared using an alloy composition having Dy substituted for part of Nd in Alloy A, so as to achieve a coercive force increase of 500 kAm$^{-1}$, but a remanence drop of 50 mT was found.

By backscattered electron image under SEM and electron probe microanalysis (EPMA) of magnet segment M1, Dy and F were observed in the magnet. Since the magnet prior to the treatment does not contain Dy and F, the presence of Dy and F in magnet segment M1 is attributable to the absorption treatment according to the invention. Dysprosium absorbed concentrates only near grain boundaries. On the other hand, fluorine (F) is also present in the grain boundary portion and bonds with oxides (contained in the magnet prior to the treatment as incidental impurities) to form oxyfluorides. The distribution of Dy enabled to increase the coercive force while minimizing a decline of remanence.

TABLE 1

| | Magnet segment | | Br, T | HcJ, kAm$^{-1}$ | (BH)max, kJm$^{-3}$ |
|---|---|---|---|---|---|
| Example 1 | M1 | Near surface | 1.415 | 1,500 | 390 |
| | | Center | 1.420 | 1,000 | 395 |
| Example 2 | M2 | Near surface | 1.415 | 1,800 | 390 |
| | | Center | 1.420 | 1,000 | 395 |
| Comparative Example 1 | P1 | Near surface | 1.420 | 1,000 | 395 |
| | | Center | 1.420 | 1,000 | 395 |

The invention is characterized in that a large size magnet block prior to machining into the final shape is subjected to absorption treatment. The throughput of the process is improved. More specifically, in Example, a block of 109 mm long in the magnetization direction is cut into 25 magnet segments. The number of magnet bodies to be coated differs by a factor of 25, which is reflected by a saving of coating time.

As a magnet segment of variant shape, a C-shaped magnet segment was prepared by a similar procedure, having L=50 mm, W=16 mm, an inner radius of 19 mm, an outer radius of 12 mm (the center of the outer radius is shifted 10.5 mm from the center of the inner radius), and a thickness T in the magnetization direction of 3.5 mm. The only difference was shape, and its magnetic properties were the same as in Table 1.

Performance of Motors Using D-shaped Magnet Segments of Examples & Comparative Example Magnet segments M1, M2 of the invention and magnet segments P1 of Comparative Example are incorporated in permanent magnet motors, whose performance is described below. The permanent magnet motor is a surface-mounted magnet motor as shown in FIG. 4. The rotor has a six-pole structure consisting of laminated 0.5 mm magnetic steel sheets having permanent magnet segments adhesively attached to the surface thereof. The rotor has an outer diameter of 45 mm and a length of 50 mm. The stator has a nine-slot structure of laminated 0.5 mm magnetic steel sheets with a concentrated winding coil of 15 turns on each teeth.

The coils are of a three-phase Y-connection of U, V and W phases. A gap of 1 mm is defined between the rotor and the stator. In FIG. 4, the solid circle of a coil denotes that the coil winding direction is forward and the crossing (X) of a coil denotes that the coil winding direction is backward. When electric current flows across coils, magnetic fields are developed in the directions of broad arrows depicted in the stator core region, so that the rotor is rotated counterclockwise. At this point, an aft area of a permanent magnet segment in the rotating direction (a circled area in FIG. 4) is in a situation susceptible to demagnetization because the magnetic field is directed opposite to the magnetization of the permanent magnet segment.

To evaluate the degree of demagnetization, a difference in the driving torque of the motor before and after exposure to a temperature of 120° C. for 2 hours was determined. First the driving torque was measured when the motor was operated on a three-phase current mode with a RMS current of 50 A for each coil at room temperature (RT). Next the motor was placed in an oven at 120° C. where it was similarly operated with a current of 50 A. The motor was taken out of the oven and returned to room temperature, whereupon the driving torque was measured during similar 50-A operation. The term "% demagnetization" represents a percent torque reduction by demagnetization=[(driving torque at RT after placement in oven)−(driving torque at RT before placement in oven)]/(driving torque at RT before placement in oven).

Table 2 reports values of percent torque reduction by demagnetization. The motor using magnet segments having a low coercive force in Comparative Example 1 evidenced demagnetization, indicating that it could not be used in a 120° C. environment. In contrast, the motors using magnet segments having a coercive force increased by the inventive treatment in Examples 1 and 2 evidenced no demagnetization at 120° C. Although the coercive force at the center of magnet segment was equal between Examples and Comparative Example, the coercive force of a magnet segment at the edge (corresponding to a portion of magnet segment which is susceptible to demagnetization in the permanent magnet motor) could be increased by the inventive treatment, which ensured that the motor was resistant to demagnetization.

TABLE 2

Torque reduction by demagnetization of motor using D-shaped magnet segments

| | Magnet segment | Demagnetization at 120° C., % |
|---|---|---|
| Example 1 | M1 | 0 |
| Example 2 | M2 | 0 |
| Comparative Example 1 | P1 | 12 |

Figure 6:
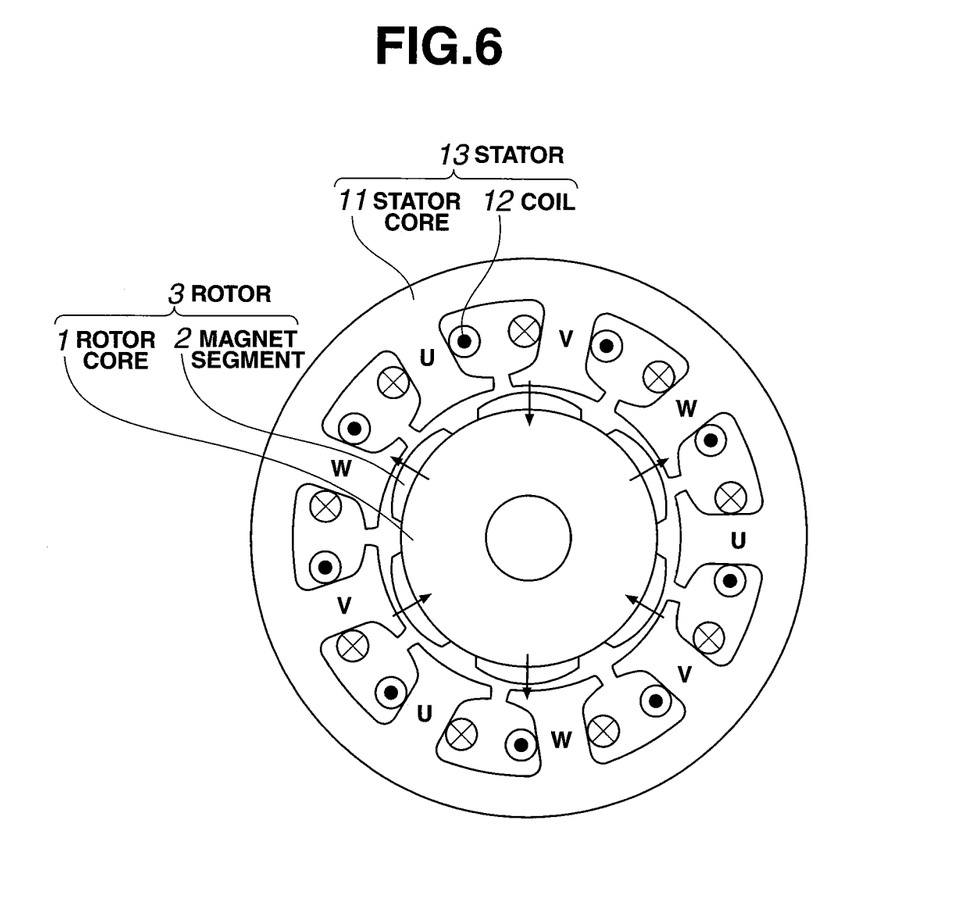
FIG. 6 is a cross-sectional view of another exemplary 6 pole, 9 slot, surface-mounted permanent magnet motor.

Performance of Motors Using C-shaped Magnet Segments of Examples & Comparative Example Magnet segments M1, M2 of the invention and magnet segments P1 of Comparative Example are incorporated in permanent magnet motors, whose performance is described below. The permanent magnet motor is as shown in FIG. 6. The stator is the same as that in the motor of FIG. 4 using D-shaped magnet segments. The rotor has a six-pole structure consisting of laminated 0.5 mm magnetic steel sheets having C-shaped permanent magnet segments adhesively attached to the surface thereof. The rotor has an outer diameter of 45 mm and a length of 50 mm.

As in the motor using D-shaped magnet segments, demagnetization effect at 120° C. was evaluated. The results are shown in Table 3. The motor using magnet segments having a low coercive force in Comparative Example 1 evidenced demagnetization, indicating that it could not be used in a 120° C. environment. It is noted that demagnetization in the motor using C-shaped magnet segments is less than that in the motor using D-shaped magnet segments, because C-shaped magnet segments have a greater thickness at the edge. In contrast, the motors using magnet segments having a coercive force increased by the inventive treatment in Examples 1 and 2 evidenced no demagnetization at 120° C. Although the coercive force at the center of magnet segment was equal between Examples and Comparative Example, the coercive force of a magnet segment at the edge (corresponding to a portion of magnet segment which is susceptible to demagnetization in the permanent magnet motor) could be increased by the inventive treatment, which ensured that the motor was resistant to demagnetization.

TABLE 3

Torque reduction by demagnetization of motor using C-shaped magnet segments

| | Magnet segment | Demagnetization at 120° C., % |
|---|---|---|
| Example 1 | M1 | 0 |
| Example 2 | M2 | 0 |
| Comparative Example 1 | P1 | 6 |

While Examples refer to permanent magnet motors, permanent magnet power generators have the same advantages because they are of the same structure to which the magnet segments of the invention are applicable.

| LEGENDS | |
|---|---|
| 1 | rotor core |
| 2 | magnet segment |
| 3 | rotor |
| 10 | rotor yoke |
| 11 | stator core |
| 12 | coil |
| 13 | stator |
| 14 | stator yoke |
| 100 | sintered Nd base magnet block |
| 100a | magnet segment |

The invention claimed is:

1. A method for preparing a sintered Nd base magnet comprising in the recited order, the steps of:
   providing a sintered Nd base magnet block having surfaces perpendicular to a magnetization direction and extending to the magnetization direction;
   coating the surfaces of the magnet block excluding the surface perpendicular to the magnetization direction with a Dy or Tb oxide powder, a Dy or Tb fluoride powder, or a Dy or Tb-containing alloy powder, thereby obtaining a coated block;
   heating the coated block so that the Dy or Tb in the Dy or Tb oxide powder, the Dy or Tb fluoride powder, or the Dy or Tb-containing alloy powder, diffuses into the block;
   cutting the coated block in a plane perpendicular to the magnetization direction to form a cut section into a magnet segment having a coercive force distribution on the cut section so that the coercive force is high at a periphery of the cut section and lower toward an inside of the cut section and a constant coercive force distribution in the magnetization direction; and then machining the magnet segment on the surface perpendicular to the magnetization direction so as to make a cross-section along the magnetization direction into a C or D shape.

2. A method for preparing a sintered Nd base magnet according to claim 1, wherein the magnet block has a maximum dimension of up to 100 mm in a Dy or Tb-diffusing direction perpendicular to the magnetization direction and a maximum length of at least 30 mm in the magnetization direction.

\* \* \* \* \*